United States Patent [19]
Marceau

[11] 3,894,440
[45] July 15, 1975

[54] ROTATION RESPONSIVE FLUID PRESSURE ACTUATOR DEVICES

[76] Inventor: René Marceau, Honfleur, County of Bellechasse, Quebec, Canada

[22] Filed: Feb. 20, 1974

[21] Appl. No.: 444,156

Related U.S. Application Data

[63] Continuation-in-part of Ser. No. 262,650, June 14, 1972, Pat. No. 3,796,519.

[52] U.S. Cl. ............... 74/230.17 F; 60/468; 60/473; 60/494
[51] Int. Cl. ............................................ F16h 55/52
[58] Field of Search ............ 60/431, 433, 468, 473, 60/494, 449; 74/230.17 F

[56] References Cited
UNITED STATES PATENTS

| | | | |
|---|---|---|---|
| 2,731,849 | 1/1956 | Rockwood et al. | 74/230.17 F |
| 3,135,087 | 6/1964 | Ebert | 60/468 X |
| 3,146,633 | 9/1964 | Schmitter et al. | 74/230.17 F |

*Primary Examiner*—Edgar W. Geoghegan

[57] ABSTRACT

A rotation responsive actuator or governor embodied in a variable pressure pump or a variable diameter pulley and adapted to advantageously replace the conventional governors of the centrifugal weight type. This rotation responsive actuator includes a cylindrical chamber, a piston rotatable in the latter about the axis thereof, impeller blades and a passage in the piston arranged to impel hydraulic fluid from one side to the other of the piston and thus produce a pressure differential across the latter which displaces the piston and an actuation member connected thereto in relation to the speed of rotation of the piston. In the pump, the above actuator controls an inlet valve, while in the variable diameter pulley, the actuator controls the axially displaceable flange.

14 Claims, 27 Drawing Figures

ROTATION RESPONSIVE FLUID PRESSURE ACTUATOR DEVICES

This is a continuation-in-part of application Ser. No. 262,650, filed June 14, 1972, for "ROTARY FLUID HANDLING DEVICE," now U.S. Pat. No. 3,796,519, granted Mar. 12, 1974.

This invention relates to rotation responsive actuator devices or governors and, more particularly, to a rotation responsive fluid pressure actuator or governor.

The rotation responsive actuator devices or governors which have been proposed so far include a centrifugal weight mechanism or assembly, such as commonly used to synchronize electric generators. Such conventional centrifugal weight mechanism or assembly results in a relatively disadvantageously bulky and vibration-prone installation, which thus restricts the application thereof, such as in vehicles.

It is a general object of the present invention to provide a rotation responsive actuator or governor of improved construction involving fluid pressure actuation.

It is another general object of this invention to provide a rotation responsive actuator or governor which is particularly well adapted for use in vehicles where weight and space are important factors.

It is another object of the invention to provide a rotation responsive actuator more advantageously using a rotatable piston and impeller assembly instead of the disadvantageously vibrating and more bulky centrifugal weight mechanism or assembly.

It is a more specific object of the invention to provide a rotation responsive fluid pressure actuator including a piston also acting as an impeller for simplicity of construction and operation.

It is a further object of the invention to provide a rotation responsive fluid pressure actuator in combination with a variable diameter pulley for convenient axial displacement of one flange of the latter in response to the speed of rotation of the pulley.

The invention will become better understood in the light of the following detailed description of preferred embodiments thereof, which are illustrated, by way of example, in the accompanying drawings, wherein.

Figure 26:
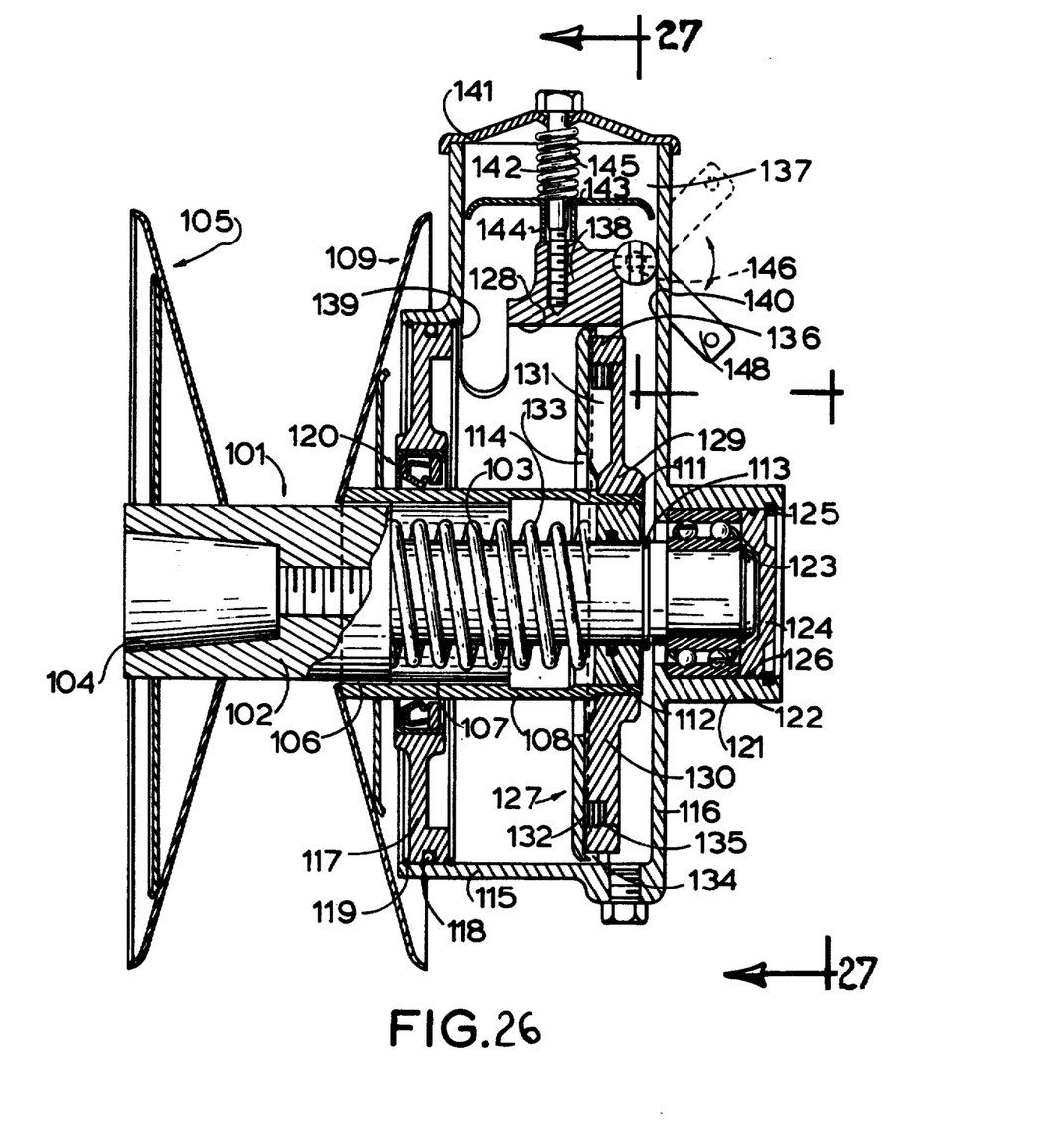
FIG. 26 is a longitudinal sectional view through a pressure responsive variable diameter pulley illustrating a second embodiment of a rotation responsive fluid pressure actuator according to the invention.
Figure 27:
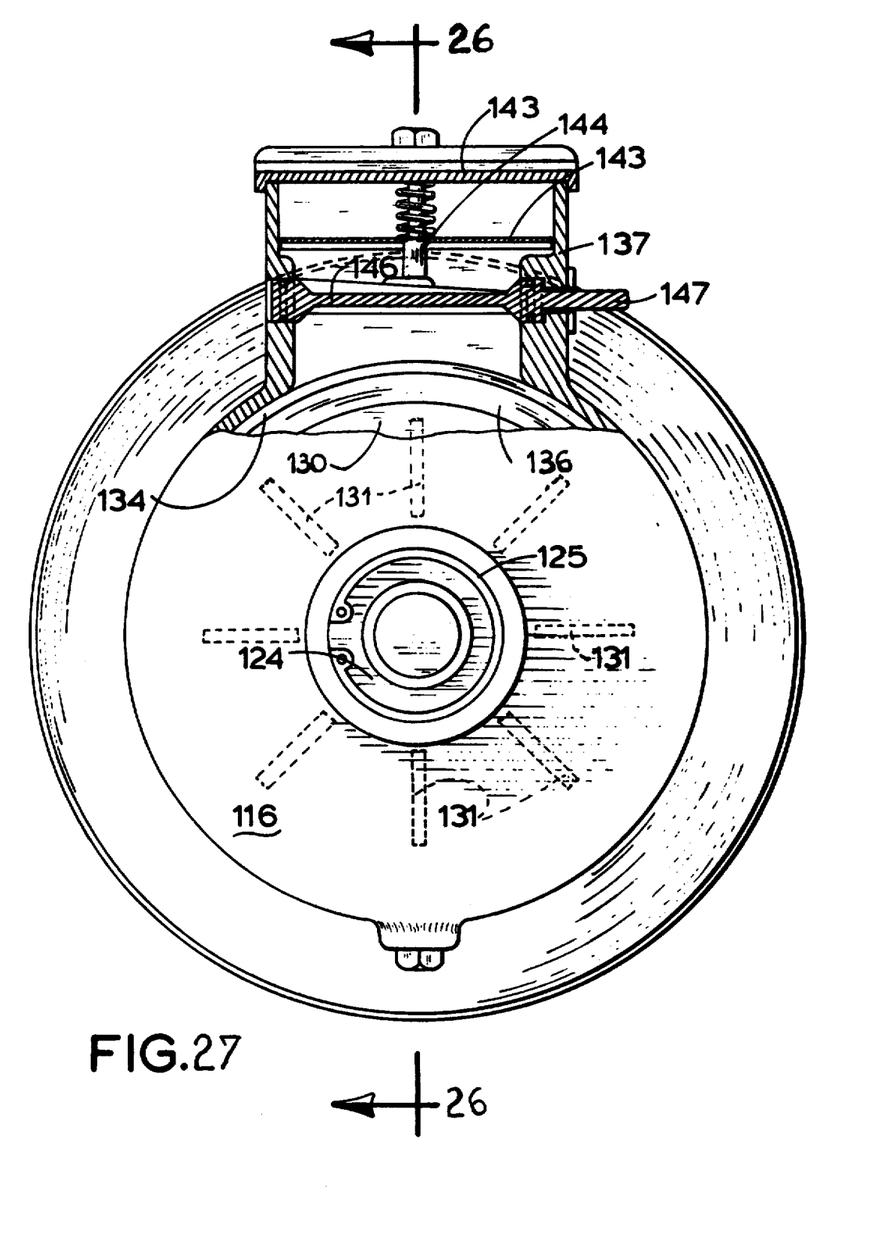
FIG. 27 is a partial sectional view as seen along line 27—27 in FIG. 26.

The present invention defines a rotation responsive fluid pressure actuator which, according to a first embodiment illustrated in FIGS. 1 to 25 inclusive, is installed in a pump to control an inlet valve member thereof, and according to a second embodiment illustrated in FIGS. 26 and 27, is installed in a variable diameter pulley assembly to actuate an axially displaceable flange thereof.

The actuator as used in association with a variable flow pump will now be described.

Figure 1:
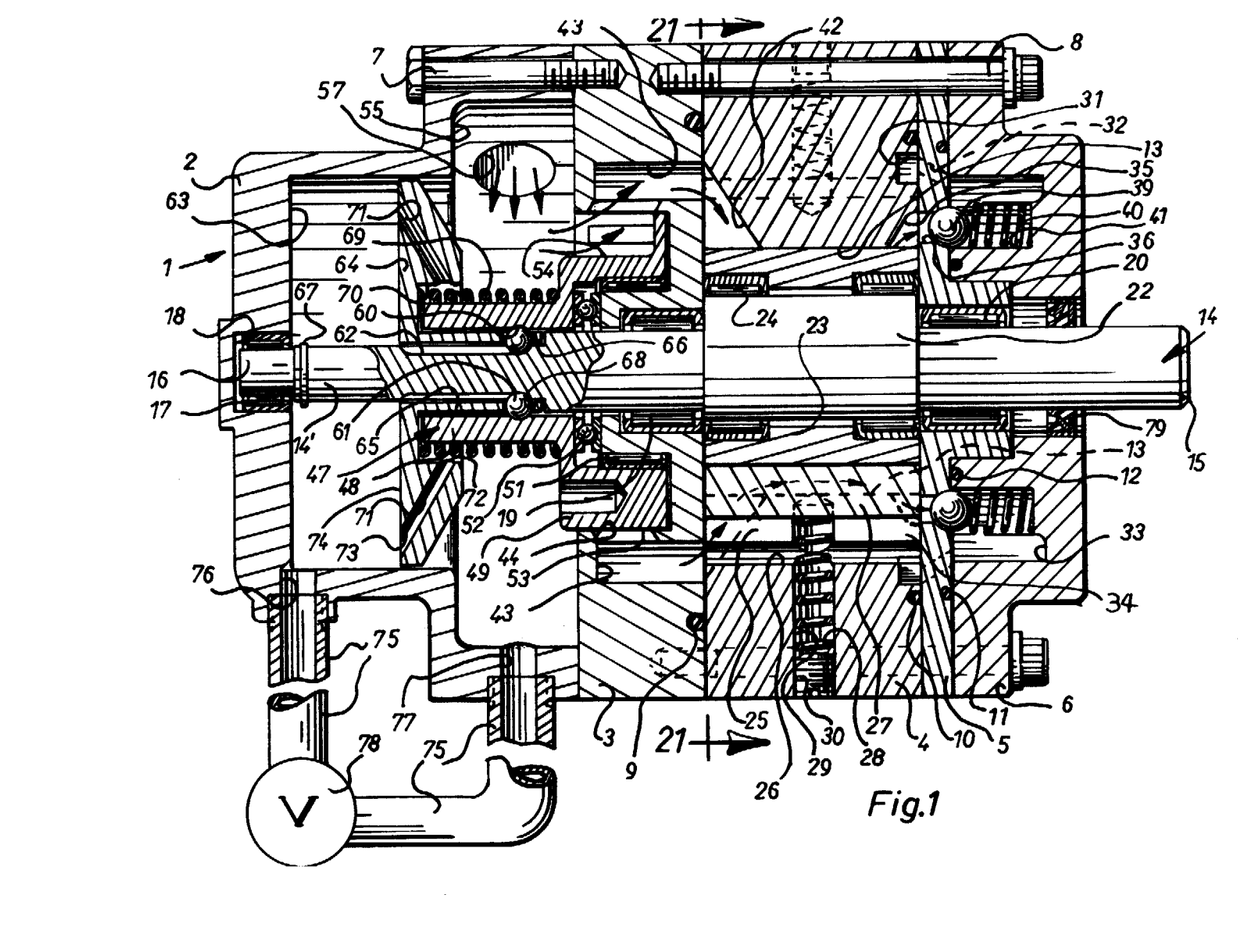
FIG. 1 is a longitudinal section through a variable flow hydraulic pump according to a first embodiment of the invention, including a rotation responsive fluid pressure actuator controlling a valve of the pump; this section is taken on line 1—1 of FIG. 11 as far as the pump housing is concerned.

Referring to FIG. 1, the present invention will first be described in relation with a variable flow hydraulic pump wherein the variation of the flow is controlled by a centrifugally-operated actuator or governor. This pump comprises: a housing or casing, generally indicated at 1, and consisting of various parts bolted together, said parts comprising an end cover 2 defining a fluid admission chamber and cylinder for the rotation responsive actuator or governor, a housing part 3 forming inlet ports, a housing main part 4 defining a pumping chamber, a housing part 5 forming valve seats for the outlet ports, and an outlet cover part 6.

End cover 2 is secured to housing part 3 by means of bolts 7 all around the periphery of the housing, while housing parts 4, 5 and 6 are secured to part 3 by means of bolts 8, also extending all around the periphery of the housing 1. The junction between parts 3, 4, 5, and 6 is made fluid-proof by means of O-rings 9, 10, 11, and 12, as these junctions are submitted to high fluid pressure.

Housing part 4 defines a central cylindrical chamber 13. A shaft 14 is mounted within the housing 1 and is coaxial with chamber 13. The end 15 of shaft 14 protrudes from the housing 1 at cover part 6 and is adapted to be driven by a suitable motor. The opposite end 16 of the shaft 14 is journalled by means of needle bearing 17 in a recess 18 made in end cover 2. The shaft is further journalled by means of needle bearings 19 and 20 in parts 3 and 5 immediately on each side of chamber 13.

A cylindrical cam 22 (see FIGS. 1, 14, and 21) is mounted on shaft 14 and is preferably integrally formed therewith, the cylindrical surface of cam 22 being eccentric to the axis of shaft 14. The cam 22 is substantially coextensive with the chamber 13 and the end faces of the cam are therefore in sliding contact with the adjacent flat faces of housing parts 3 and 5.

A cylindrical sleeve 23 is freely rotatably mounted on cam 22 by means of needle bearings 24. The sleeve 23 is coextensive with cam 22 and its ends are slidable on the adjacent flat faces of housing parts 3 and 5.

Sleeve 23 does not rotate with shaft 14 but accomplishes an eccentric movement within chamber 13.

Figures 21, 22, 23:
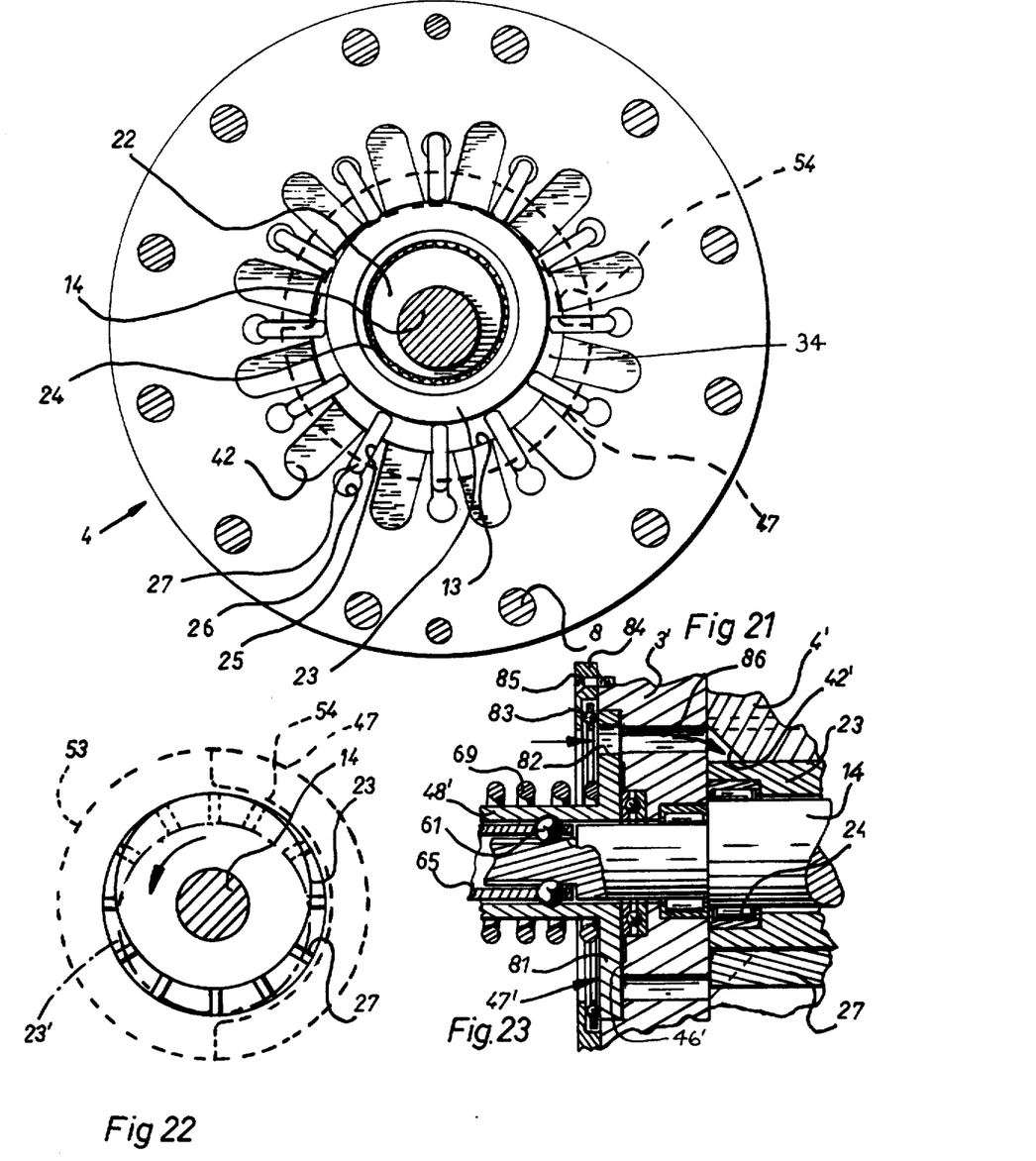
FIG. 21 is a cross-section of the assembled device, taken along line 21—21 of FIG. 1.
FIG. 22 is a schematic view of the relation of the cam, housing and rotary inlet valve for maximum flow and zero flow.
FIG. 23 is a longitudinal section of another embodiment of the inlet valve.

Referring to FIG. 21, it will be seen that the outside cylindrical surface of sleeve 23 is eccentric with respect to cylindrical chamber 13 and its zone at a maximum distance from the axis of shaft 14 may even make contact with the surface of chamber 13. Rotation of the shaft will therefore cause radial reciprocating movement of any given longitudinal zone of the sleeve 23 within chamber 13 with very little rotational displacement of the sleeve with respect to housing part 4.

Referring to FIGS. 1, 11, 12, and 21, housing main part 4 is provided with a plurality, for instance 12 slots 25, which open within chamber 13, each radially directed with respect to the chamber 13 and extending in longitudinal planes passing through the axes of rotation of shaft 14. These slots extend throughout the thickness of housing part 4 and, therefore, open at both faces thereof. These slots have enlarged radially outer ends 26. The slots are equally angularly spaced around chamber 13 and each receives a partition member in the form of a flat blade 27 slidable in the slot for radial reciprocating movement. Each blade 27 is coextensive with the chamber 23 and, therefore, its ends are in slidable contact with housing parts 3 and 5. The radially inner edge of each blade 27 is in fluid-proof contact with sleeve 23. The blades 27 are each urged radially inwardly against sleeve 23 by means of a compression coil spring 28 lodged within a radial bore 29 of housing part 4, abutting against the back of the associated blade 27 at the center of the blade and having its other end abutting against a setscrew 30 screwed within the outer end of bore 29 at the peripheral outer face of the housing.

Preferably, fluid under pressure is additionally admitted behind blades 27 to urge the latter in contact with sleeve 23. For this purpose, the enlarged outer ends 26 of slots 25 are in communication with a circular manifold groove 31 at the pressure side of housing part 4 and said manifold groove 31 is in communication with one or more passages 32 (see FIGS. 15, 16, and 17) in communication with an outlet manifold chamber 33 made in cover part 6. Thus, the fluid under pressure in chamber 33 is admitted behind each blade 27.

Figures 11, 12, 13, 14, 24, 25:
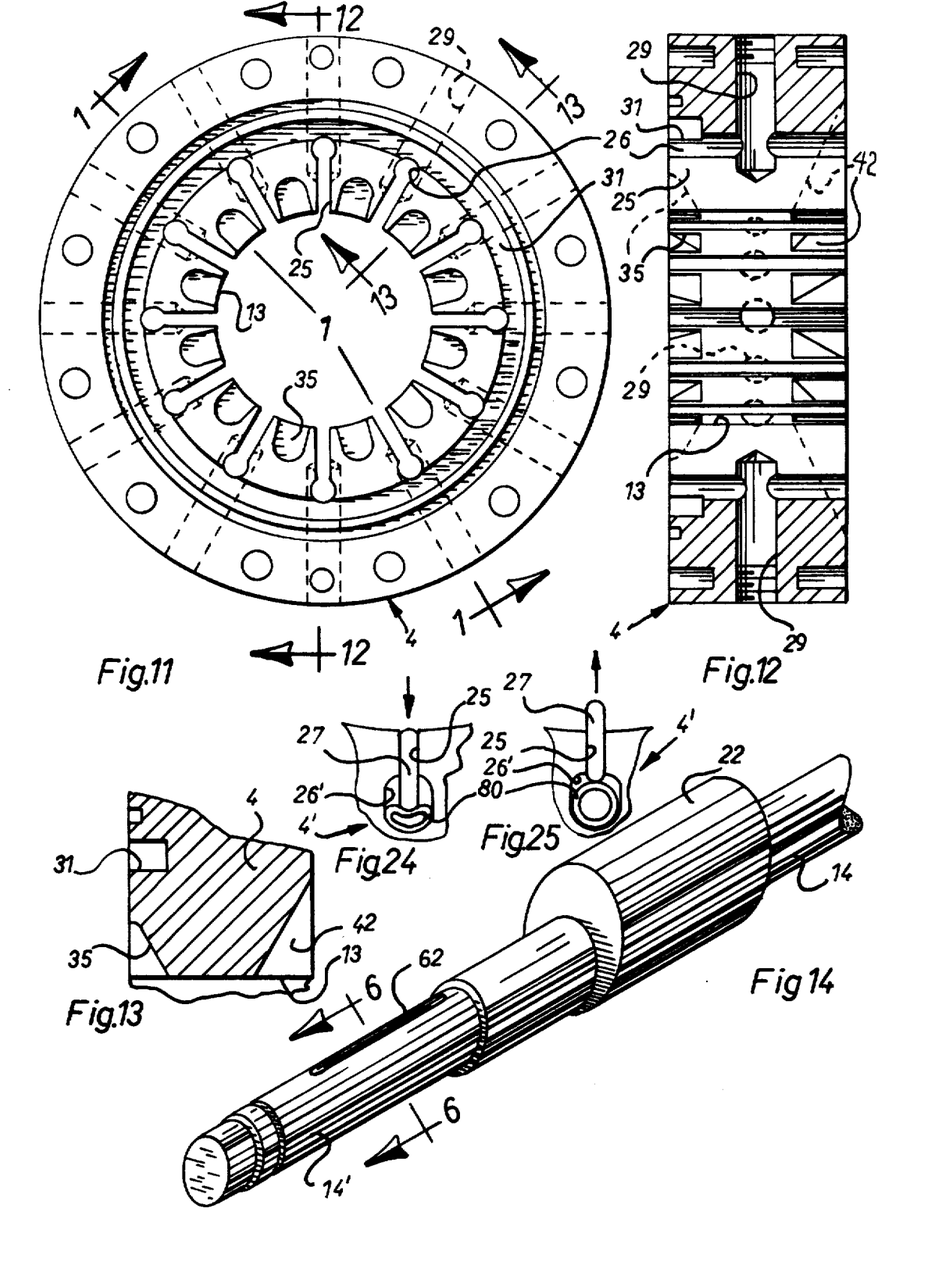
FIG. 11 is an elevation of the main housing part showing the outlet face.
FIG. 12 is a longitudinal section of the main housing part, taken along line 12—12 of FIG. 11.
FIG. 13 is a partial section of the main housing part, taken along line 13—13 of FIG. 11.
FIG. 14 is a partial perspective view of the shaft and cam mounted thereon.
FIGS. 24 and 25 are end elevations of the main housing part showing a modified system for urging the blades against the cam.

As an alternative, shown in FIGS. 24 and 25, coil springs 28 may be entirely dispensed with and, while using the fluid under pressure behind blades 27 to urge the same in contact with sleeve 23 during operation of the pump, each enlarged end 26' of slots 25 in housing part 4' is fitted with a tube 80, of rubber or the like elastic material, to initially urge the blade against sleeve 23 at the start of the pumping operation, until the pressure is built up. These rubber tubes 80 are loose fitting within the slot ends 26' to admit fluid under pressure behind the blades.

Figures 15, 16, 17, 18, 19, 20:
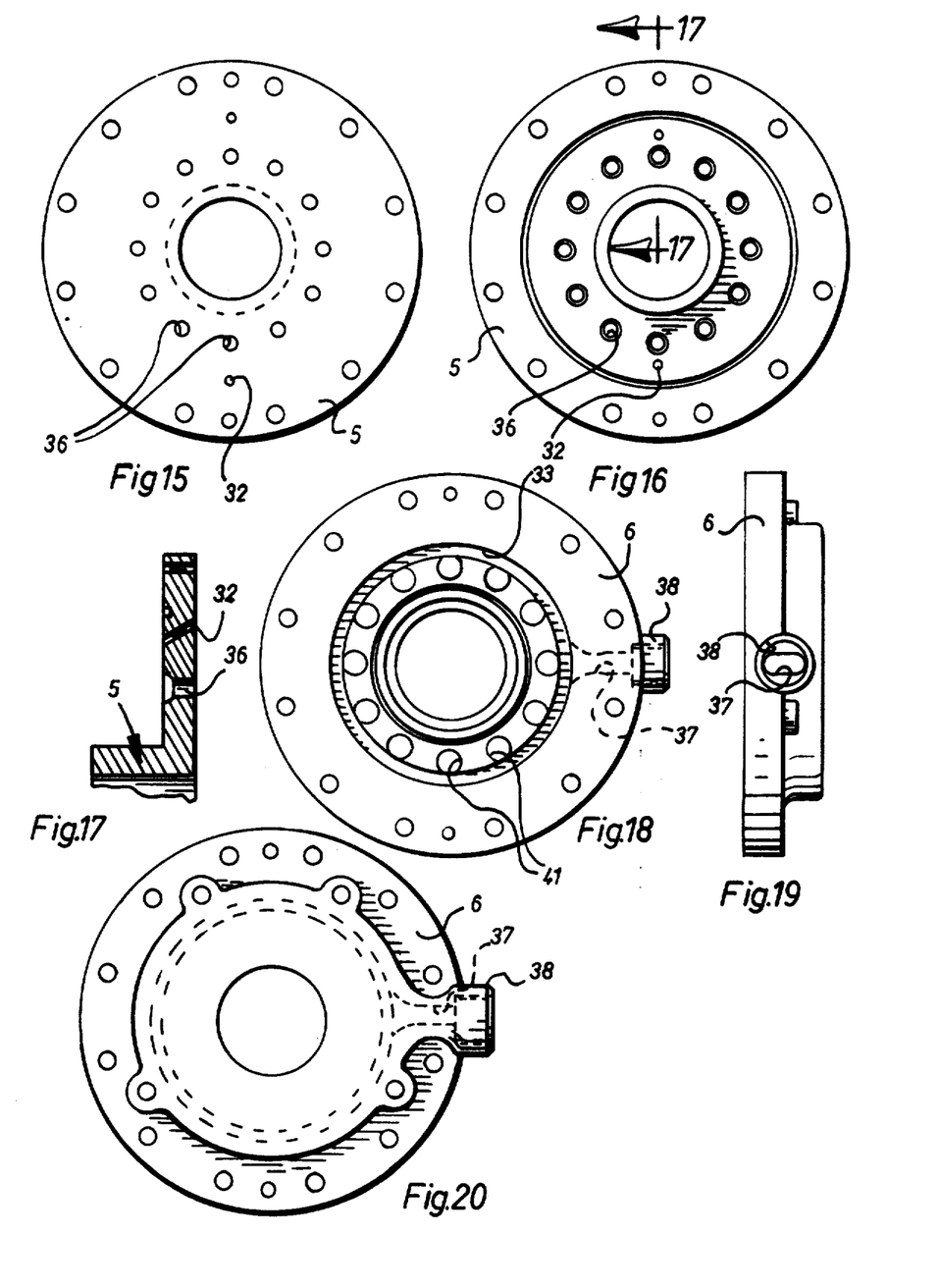
FIG. 15 is a side elevation of the pressure face of the plate forming valve seats for the check valves closing the outlet ports of the device.
FIG. 16 is an elevation of the plate of FIG. 15, shown at its opposite face.
FIG. 17 is a partial longitudinal section taken along line 17—17 of FIG. 16.
FIG. 18 is an elevation of the cover plate on the outlet side of the device, showing its inner face.
FIG. 19 is a side elevation of the cover plate of FIG. 18.
FIG. 20 is an elevation of the cover plate of FIGS. 18 and 19, showing its outer face.

The blades 27 therefore divide the part of the chamber surrounding sleeve 23 into a plurality of variable volume compartments 34. Each compartment is associated with an inlet port and an outlet port. Each outlet port comprises a bevelled notch 35 made at the pressure face of housing part 4 between two adjacent slots 25. Each notch 35 is disposed in register with a hole 36 made in housing part 5, said hole being in communication with the annular manifold outlet chamber 33 made in cover part 6. Said chamber 33 is in communication with the exterior through lateral outlet passage 37, as shown in FIGS. 18, 19, and 20, said passage opening within a connection nipple 38.

Each hole 36 provides a valve seat for a ball 39 urged against the valve seat by a compression coil spring 40 located in a blind bore 41 made in housing part 6, said bore 41 being in lateral communication with manifold chamber 33. Each ball 39 therefore provides a check valve which opens under pressure within the associated compartment 34 and closes the outlet port when the pressure in manifold chamber 33 is greater than in the compartment 34 associated with the check valve.

Figure 10:
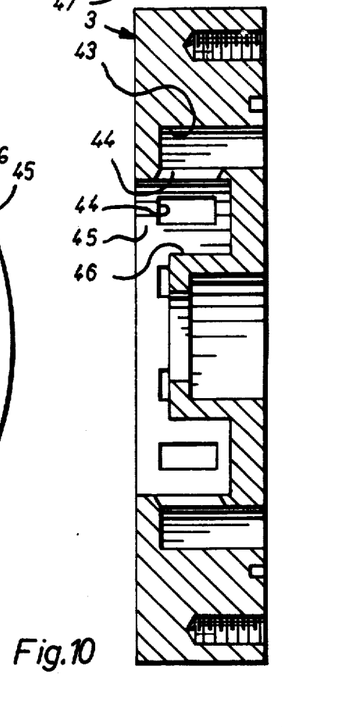
FIG. 10 is a longitudinal section as seen along line 10—10 in FIG. 9.

Each inlet port comprises a bevelled notch 42, made in housing part 4 between two adjacent slots 25. Each notch 42 is in communication with an associated blind bore 43 made in housing part 3. Each blind bore 43 communicates through lateral opening 44 with the inside of the chamber 13. Lateral openings 44 are of generally rectangular shape, as shown in FIG. 10, and are formed at a radially inwardly directed surface of revolution, namely a cylindrical surface, indicated at 45, which is coaxial with the axis of rotation of shaft 14.

Cylindrical surface 45 constitutes the outer side of an annular groove 46, made in part 3 and opening at the low pressure face thereof.

Figure 7:
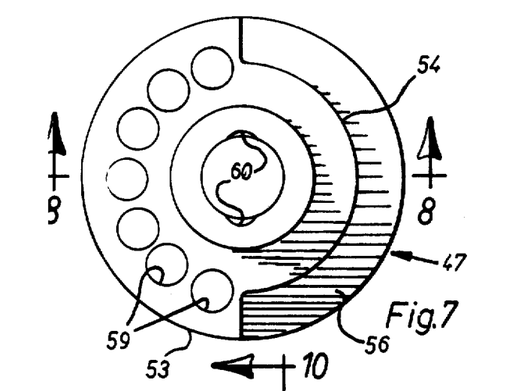
FIG. 7 is an axial view of a valve member forming part of the pump of FIG. 1.
Figure 8:
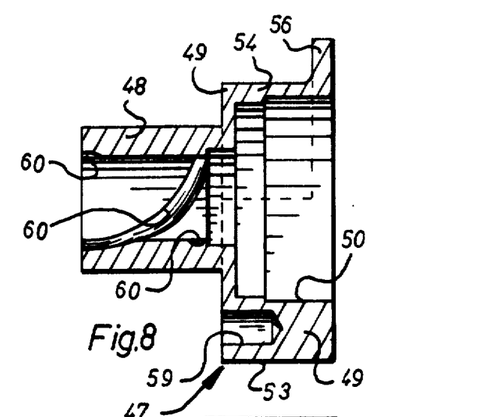
FIG. 8 is a longitudinal section as seen along line 8—8 in FIG. 7.
Figure 9:
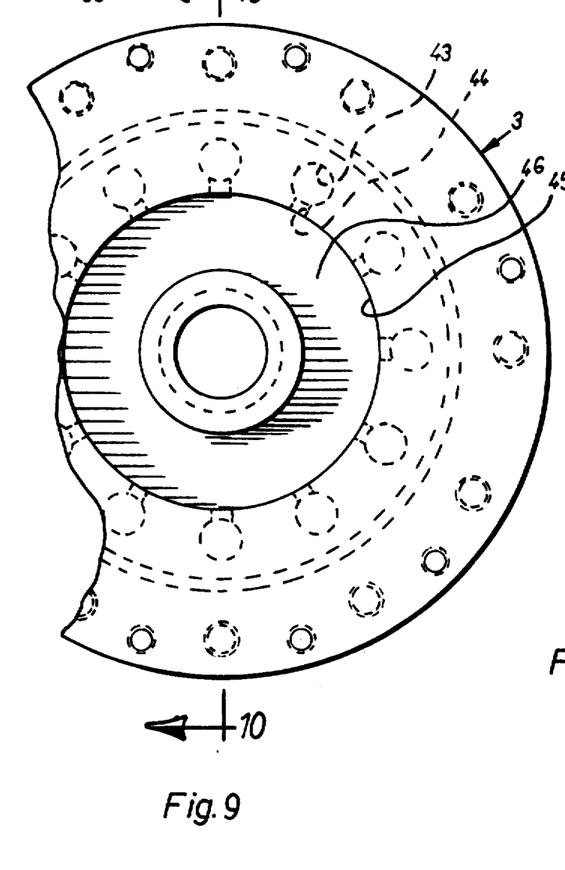
FIG. 9 is an axial view of a housing plate forming intake ports for the pump.

The inlet ports, composed of passages 44, 43, 42, are closed in succession by a valve meber 47 which rotates with shaft 14. Said valve member 47 is shown in FIGS. 1, 7, and 8. It has a hub 48 surrounding shaft 14 and protruding from one end of a head 49, which defines a cylindrical recess 50 at one end of the valve. The cylindrical wall of said recess 50 is journalled by means of needle bearing 51 on the radially inner cylindrical surface of notch 46 of housing part 3, while there is interposed an axial thrust bearing 52 between the bottom of recess 50 and housing part 4. The flat outer face of head 49 has a slight clearance with the bottom of recess 46.

The radially outer peripheral cylindrical surface 53 of head 49 forms a surface of revolution coaxial with shaft 14 and in sliding fluid-proof contact with the surface of revolution 45 of housing part 3.

Outer surface 53 extends around the shaft 14 the extent of half a circle, so that the remaining portion of head 49 forms an annular recess 54 for establishing communication between the inlet ports opposite said recess and an admission chamber 55 defined by cover part 2, as shown in FIG. 1.

Preferably, recess 54 does not extend throughout the entire thickness of head 49 so that, opposite recess 54, there is formed a radial flange 56 extending between the bottom of groove 46 and the adjacent ends of inlet port openings 44.

Figure 2:
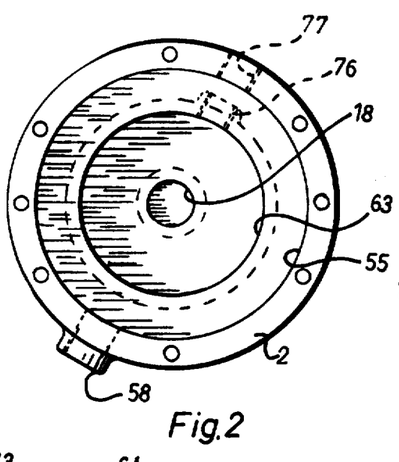
FIG. 2 is an elevation view of the inside face of an end cover forming part of a casing defining a fluid chamber.
Figure 3:
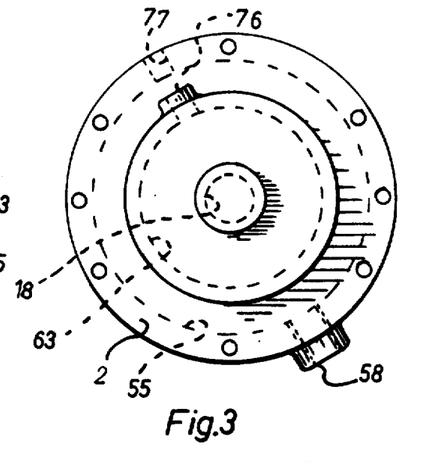
FIG. 3 is an elevation view of the outside face of the end cover.
Figure 4:
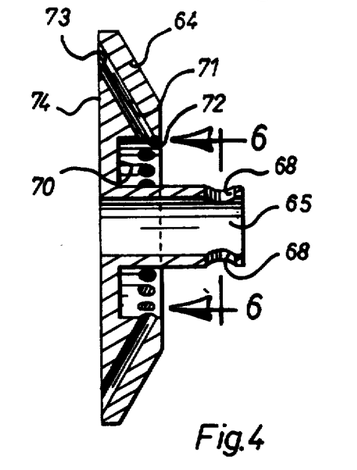
FIG. 4 is a diametrical section of a piston forming part of the rotation responsive fluid pressure actuator of FIG. 1.
Figure 5:
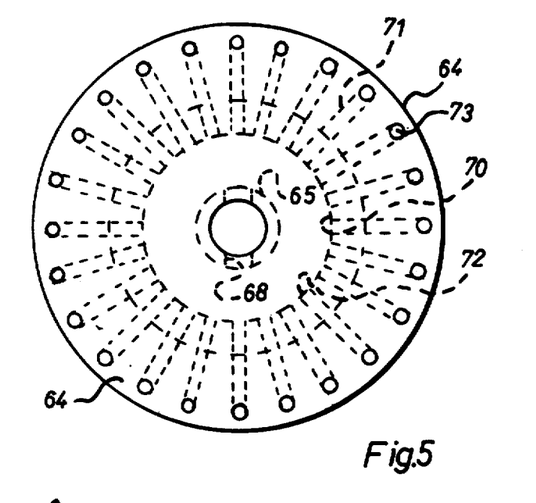
FIG. 5 is an axial view of the piston as seen from the left in FIG. 4.
Figure 6:
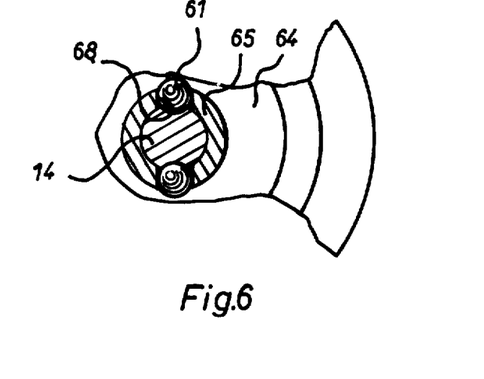
FIG. 6 is a cross-sectional view as seen along line 6—6 in FIG. 4, with the associated shaft shown in section along line 6—6 of FIG. 14.

Admission chamber 55 is supplied with fluid, such as oil, through admission opening 57 extending laterally through cover part 2 and ending in a connection nipple 58, shown in FIGS. 2 and 3, having threads for connection to suitable piping connected to a fluid supply. Thus, oil is admitted to the compartments 34 between the blades 27 through these inlet ports which are successively closed by the valve 47 which rotates with shaft 14.

This valve 47 is provided, as shown in FIGS. 7 and 8, with a plurality of blind bores 59 for dynamically balancing the valve. The inside cylindrical surface of hub 48 has two diametrically opposite helical grooves 60 extending through at least one-half circle and each adapted to receive one of two diametrically opposed balls 61, each ball fitted within a longitudinally extending groove 62 made in shaft 14, the two grooves 62 being diametrically opposed and each receiving a ball 61. Thus, it will be understood that rotation of shaft 14 causes synchronized rotation of valve 47 through the balls 61. Displacement of the balls 61 within longitudinal grooves 62 will cause shifting of the angular position of the valve 47 with respect to shaft 14, because balls 61 ride in helical grooves 60 of the valve member. However, valve 47 is not moved longitudinally of shaft 14.

Obviously, the relative positions of grooves 60 and 62 could be inverted, namely helical grooves 60 may be made in the shaft 14 and longitudinal grooves made at the inside surface of valve hub 48.

In accordance with a feature of the invention, longitudinal positioning of balls 61 is achieved by a simple hydraulically-operated actuator or governor system responsive to the speed of rotation of shaft 14. The cover 2 forms a cylindrical chamber 63 coaxial with shaft 14 and closed at the outer end of the casing 1 and in full communication with admission chamber 55.

A rotary piston 64 has a loose fit within cylindrical chamber 63 and is axially displaceable therein. Piston 64 has a sleeve-like hub 65 fitted on the reduced portion 14' of shaft 14 for longitudinal displacement between step 66 of the shaft 14 and a ring 67 carried by the shaft adjacent the closed end of cover 2.

The outer end of hub 65 is provided with two diametrically opposed holes 68 for receiving balls 61, said balls protruding inside and outside of the sleeve. Thus, the balls serve to lock the rotary piston 64 against rotation relative to shaft 14.

A compression coil spring 69 surrounds the hub 48 of valve member 47 and abuts against the head 49 of said valve member at one end and against the rotary piston 64 at the other end, so as to urge said piston away from admission chamber 55 toward a limit position against ring 67.

More particularly, spring 69 abuts against the bottom of an annular recess 70 made in the admission side of piston 64 and surrounding hub 65.

Piston 64 is provided with a plurality of radially extending through bores 71 inclined with respect to the rotary axis of the piston and having their radially inner inlet ends 72 opening within recess 70 and their radially outer outlet ends 73 opening directly at radial face 74 facing within cylindrical chamber 63.

The admission chamber 55 and cylindrical chamber 63 are initially filled with fluid, such as oil. Upon rotation of shaft 14, piston 64 simultaneously rotates and acts as an impeller; the oil in bores 71 is submitted to centrifugal force, thereby increasing the pressure of the oil behind the piston within chamber 63. This increased pressure, together with the axial reaction force developed by the fluid through bores 71, causes axial movement of the rotary piston 64 towards valve member 47 against the action of coil spring 69. Thus, longitudinal movement of the piston relative to the shaft produces angular shifting of the valve member 47 with respect to the shaft 14, and consequently, with respect to the inlet ports defined by housing part 3.

FIG. 1 shows the limit position attained by piston 64 against hydraulic pressure in cylinder 63. In this position, the angular relationship of the valve member 47 is such that the valve member 47 opens the inlet ports of all of the compartments 34 which are in the process of expanding and closes the inlet ports of all the compartments 34 which are in the process of contracting.

Means are provided to decrease the pressure differential between admission chamber 55 and cylinder 63. A bypass, or flow return piping 75, connects lateral openings 76 and 77 in direct communication with cylinder 63 and admission chamber 55 respectively. A flow adjusting valve 78 is series connected in the bypass tube 75, whereby progressive opening of the valve 78 will decrease the differential pressure existing between chambers 55 and 63.

Referring to FIG. 1, a sealing gasket 79 is interposed between shaft 14 and the housing part 6.

Valve member 47 and the inlet ports could be modified in the following manner:

Referring to FIG. 23, the valve member 47' is a flat disc 81 applied against the bottom of a cylindrical recess 46' of housing part 3' and provided with a sleeve-like hub 48' having internal helical grooves, such as grooves 60 of valve member 47. The disc is provided with a semiannular slot 82 coaxial with the axis of rotation of the valve and in register with inlet ports 86 extending axially of part 3', all around said part and in communication with the shallower notches 42' of main housing part 4'. The valve member is provided with a suitable thrust bearing 83 to prevent separation of the valve member from the bottom of recess 46 under the axial pressure exerted on the valve by the fluid pressurized in compartments 34. Bearing 83 is retained by a ring 84, secured to housing part 3' by bolts 85. As an alternative, housing part 3' can be dispensed with valve disc 81 applied directly against part 4' and the ends of blades 27, in which case the inlet ports are formed by the ends of compartments 34.

The check valves 36, 39, and 40 of FIG. 1, for the outlet ports of the pump, could be replaced by a valving arrangement similar to the valving arrangement on the intake port side of the pump, but with the valve member on the outlet side shifted 180° relative to the valve member 47 on the inlet side. This arrangement is very simple in the case of a constant flow pump in which the two valve members 47 are fast on the shaft 14.

Upon operation of the hydraulic pump, it will be noted that sleeve 23, due to its eccentric movement, will cause progressive contracting of half the compartments 24 which are on one side of the longitudinal zone of the sleeve 23 which is radially outermost, and progressive simultaneous expansion of the remaining half of the compartments which are on the other side of said radially outermost sleeve zone.

Supposing the angular position of the valve member 47 is as shown in FIG. 22 with respect to the shaft 14 and the sleeve 23, as shown in full lines, the shaft rotating in anticlockwise direction, the surface 53 of the valve 47 closes all the compartments 34 in the process of contracting and, therefore, which are pumping the fluid past the check valves 39, while all the compartments which are in process of expanding are open to the admission chamber 55 for receiving fluid. Thus, in this position, the pump is working at full flow. However, if the valve is shifted through 180° with respect to the shaft 14, or, which amounts to the same thing, supposing the shaft is rotated through 180° while retaining the valve 47 in the same position, we obtain the position of the sleeve 23, as shown in dot-and-dash line at 23' relative to the valve 47. In this case, all the compartments which are expanding, the shaft again rotating in anticlockwise direction, are closed by surface 53 of the valve 47 while all the compartments which are contracting are open to the admission chamber. Thus, the pump has zero flow, the timing of the valve with respect to the cam having been shifted through 180° from full flow. If the valve is shifted through 90° from full flow, as shown in FIG. 21, fluid is prevented from being admitted during half the admission phase of the expanding compartments 34 and freely returns to the admission chamber 55 during half the expulsion phase of the contracting compartments, resulting in a fraction of the full flow of the pump for a given speed of rotation of the shaft.

In the example shown wherein there are six compartments in the process of admitting fluid and six compartments in the process of expulsing fluid at the same time, shifting of the valve 47 will result in six main rates of flow from zero to maximum of flow with intermediate rates for intermediate angular positions of the valve member 47.

The valve member 47 or 47' is angularly shifted with respect to the shaft by axial movement of piston 64, as previously described. Because this piston 64 moves axially as a function of the speed of rotation of the shaft, as this speed of rotation increases, the pumping capacity of the pump will progressively increase from zero flow to full flow without naturally taking into account the increase in flow caused by the speed of rotation of shaft 14.

The range of speeds of rotation of shaft 14 for which passage from zero to full flow is achieved, can be adjusted by controlling valve 78. The more this valve 78 is open, the greater the speed of rotation of the shaft is needed to obtain full pumping capacity, since the pressure build-up in chamber 63 is slower and piston 64 is slower to move toward the position of FIG. 1.

The rotation responsive fluid pressure actuator according to the second embodiment of the invention, illustrated in FIGS. 26 and 27, is installed in a variable diameter pulley including a stub shaft 101 having a large diameter portion 102 and a smaller diameter portion 103. The larger diameter portion has a countersunk bore 104 axially extending into the outer end thereof for endwise connection of the stub shaft 101 to a drive shaft, not shown.

A first pulley flange 105 is rigidly secured, as by welding, to the larger diameter portion 102. The inner end of the larger diameter portion 102 has external splines 106 engaged by the internal splines 107 of a sleeve 108. A second pulley flange 109 is rigidly secured, as by welding, on the splined end of the sleeve 108. The pulley flanges 105 and 109 have each an operative conical surface 110 converging toward the other conical surface. Thus, the second pulley flange 109 is axially displaceable with the sleeve 108 toward and away relative to the first pulley flange 105 and, as is well known in the art, such displacement produces variation of the effective diameter of the pulley when the latter is used in conjunction with the proper belt.

A ring 111 is fitted between the smaller diameter shaft portion 103 and the unsplined end of the sleeve 108 and is rigidly secured to the latter to support it for axial sliding engagement around the stub shaft 101. A seal 112 is positioned between the ring 111 and the smaller diameter shaft portion 103. A split ring 113 engages into an appropriate groove in the smaller diameter shaft portion 103 and limits the outward axial displacement of the sleeve 108 and the second pulley flange 109. A spring 114 is coiled around the smaller diameter portion 103 in abutment against the ring 111 and the larger diameter shaft portion 102 and biases the pulley flange 109 axially away from the pulley flange 105.

A casing is coaxially formed around the sleeve 108 and includes an outer generally cylindrical shell 115 having an integral end 116 and a removable annular end plate 117. A seal 118 is positioned around the latter in contact with the inner surface of the cylindrical shell 115. A snap ring 119 secures the annular end plate 117 in position in the cylindrical shell 115. An annular seal 120, of any suitable construction, is secured in the central aperture of the annular end plate 117 for fluid-tight axial sliding of the sleeve 108 therein.

A sleeve 121 is rigidly secured endwise against the outer face of the integrally closed end 116 of the generally cylindrical shell 115. A bearing 122, of any suitable type, rotatably carries the free end of the stub shaft 101. A snap ring 123 axially holds the bearing 122 captive against an appropriate shoulder of the stub shaft 101. A lubrication cap 124 fits into the free end of the sleeve 121 and is removably retained by a snap ring 125. A seal 126 engages around the cap 124 in contact with the inner surface of the sleeve 121.

A piston 127 is mounted in a cylindrical chamber 128 formed by the cylindrical shell 115 and the annular end plate 117 and is rigidly secured by a hub portion 129 to the sleeve 108 for axial and rotational displacement therewith. The piston 127 includes a circular flange or wall 130 integral with the hub portion 129. The circular wall 130 is formed with radial impeller blades 131 axially projecting from one face thereof. An annular flange, or wall 132, having a central aperture 133, is rigidly secured to the axially opposite side of the impeller blades 131 relative to the circular flange or wall 130 for bodily rotation with the latter and the blades. The latter are arranged to centrifugally outwardly impel hydraulic fluid into the passage defined between the spaced-apart circular and annular flanges or walls 130 and 132 from the annular fluid inlet defined by the aperture 133 to a fluid outlet 134. The peripheral edge of the circular wall 130 is formed with axially extending screw threads 135. An internally threaded adjustment ring 136 is threaded on the screw threads 135 and is thus axially adjustable relative to the annular wall 132 to form a desired constriction in the passage in the piston 127. It must be noted that this passage extends through the piston from the fluid inlet 133 to the fluid outlet 134 which is arranged radially outwardly relative to the fluid inlet.

The casing portion 115 forms a radially extending conduit 137 having a substantially rectangular cross-section and a boss 138 in the conduit 137 forming a portion of the cylindrical periphery of the chamber 128. Apertures 139 and 140 are formed through the afore-mentioned cylindrical periphery, in communication with the conduit 137. A cover 141 is adapted to removably seal the mouth of the conduit 137 and is retained in closing position by a screw 142 threading into the boss 138 of the casing. A baffle plate 143 is inserted onto the screw 142 in the conduit 137 and is adapted to extend transversely of the conduit 137 and substantially close the latter. A spacing sleeve 144 is engaged around the screw 142 and spacially supports the baffle plate 143 relative to the boss 138, this producing a flow return passage extending into the conduit 137 from the aperture 139 to the aperture 140 in communication with the opposite sides respectively of the piston 127. A compression spring 145 is engaged around the screw 142 intermediate the cover 141 and the baffle plate 143 inwardly biasing the latter against the spacing sleeve 144.

A valve 146 is pivoted in the flow return passage between the boss 138 and the end wall 116 of the casing. The valve member 146 has a stem portion 147 projecting outwardly of the conduit 137 forming part of the casing. A control lever 148 engages the stem portion 147 to adjust the opening of the valve member as desired.

A connection nipple 149 is provided into the casing for drainage and to provide hydraulic pressure supply.

When the illustrated variable diameter pulley is rotated, the piston 127 is simultaneously driven with the pulley flanges 105 and 109 and hydraulic fluid outside the annular wall 132 is pumped inwardly through the inlet aperture 133, centrifugally outwardly into the passage between the walls 132 and 130 of the piston and outwardly of the latter through the annular fluid outlet 134 thereof.

If the valve member 146 is fully open and the control ring 136 is in its innermost position, a minimum pressure increase is produced against the outside of the wall 130 and the spring 114 holds the pulley flange 109 in its farther position relative to the axially fixed pulley flange 105. Thus, in such condition, a neutral may be obtained if the spacing between the pulley flanges is sufficient to prevent driving engagement of the drive belt, not shown, therewith.

The greater valve 146 closes, the higher the pressure may be increased against the outside of wall 130 and the closer the pulley flange 109 axially moves relative to the pulley flange. Thus, when the disclosed pulley is used as a drive pulley in a snowmobile or other vehicle, at idle speed, no pressure increase is produced, resulting in a neutral; as the speed of shaft 101 increases, the pressure increases on the outlet side of the impeller piston 127 and the latter pushes the pulley flange 109 toward the flange 105, causing engagement of the above-mentioned drive belt and the rotation thereof with the shaft 101. At full speed, the shaft 101 produces maximum displacement of the piston 127 and the pulley flange 109 toward the pulley flange 105 and there results a maximum speed ratio between this pulley and the other pulley, not shown, forming a conventional variable speed belt drive therewith.

The time required to reach the maximum speed ratio may be varied by adjusting the axial spacing between the control ring 136 and the wall 132; the closer is the ring to the latter, the longer it takes to increase the pressure on the outlet side of the impeller piston 127.

Such variable diameter pulley may be advantageously used on a vehicle due to the possibility of easily obtaining a neutral therewith, a smooth acceleration and a setting thereof by the control ring 136 according to the power of the particular engine installed. Besides, two such pulley drives could be used to separately drive a pair of traction wheels, or endless belts, with the steering system connected in appropriate manner to the control levers 148 of the two pulley drives such that steering would be produced by differential displacement of the two pulley flanges respectively, resulting in an increased speed ratio of one belt drive on one side of the vehicle and a decreased speed ratio of the other belt drive on the other side of the vehicle.

It will be readily understood that the rotation responsive fluid pressure actuator according to the invention can be used for other applications than for a pump and a variable diameter pulley. Also, this actuator is of simple construction and safer use than conventional governors with centrifugal weights.

I claim:

1. A rotation responsive fluid pressure actuator comprising a casing forming a cylindrical chamber, a piston coaxially rotatable and axially displaceable relative to the latter and defining a passage therethrough having opposite ends communicating with the axially opposite sides respectively of the piston, impeller means attached to said piston in communication with said passage, rotatable with said piston, and producing a variable pressure differential against said axially opposite sides upon rotation of said piston, input drive means connected to said piston to transmit rotation thereto, and an actuating device connected to said piston and axially displaceable therewith in response to said pressure differential for corresponding output action by said actuating device.

2. A rotation responsive fluid pressure actuator as defined in claim 1, wherein said piston includes surfaces radially extending therein forming said passages and constituting said impeller means.

3. An actuator as defined in claim 2, wherein said piston includes apertures radially extending therethrough in communication with said axially opposite sides thereof, forming said passages, and having their inner face forming said radially extending surfaces.

4. An actuator as defined in claim 3, wherein said piston includes a pair of axially spaced-apart walls, a fluid inlet, and a fluid outlet respectively, said fluid inlet is spaced radially inwardly of said fluid outlet relative to the axis of said piston, said passage extends between said axially spaced-apart walls and communicates said fluid inlet with said fluid outlet, and said impeller includes impeller blades secured between said walls and arranged for rotation therewith and centrifugal impelling of fluid between said walls from said fluid inlet to said fluid outlet.

5. An actuator as defined in claim 4, wherein said wall forming said fluid outlet includes a control ring adjustably mounted and arranged for adjustable constriction of said passage of said piston.

6. An actuator as defined in claim 5, wherein said wall forming said fluid outlet is formed with screw threads extending axially and coaxially relative to said axis, said ring threadably engages said screw theads and axially projects into said passage of said piston toward said wall forming said fluid inlet, thereby allowing said adjustable constriction upon screwing of said ring.

7. An actuator as defined in claim 1, wherein said input drive means includes an input shaft rotatably axially engaging in said cylindrical chamber and projecting outwardly from said casing, and said piston and said actuating device are splined onto said input shaft for axial sliding thereon.

8. An actuator as defined in claim 7, further including a spring biasing said actuating device and said piston toward a rest position.

9. An actuator as defined in claim 8, wherein said input shaft includes a smaller diameter portion and a larger diameter portion, said actuating device includes a sleeve splined onto said larger diameter portion and projecting along said smaller diameter portion, and said spring is coiled around the latter and operatively engages between said larger diameter portion and said sleeve, causing said actuating device to be biased toward the rest position.

10. An actuator as defined in claim 9, wherein said actuating device includes an abutment ring fixed inside said sleeve for axial displacement therewith in circumscribing engagement around said smaller diameter portion, an axial abutment member is secured to said smaller diameter portion in fixed axial spacing from said larger diameter portion, and said spring is confined intermediate said larger diameter portion and said abutment ring inwardly biasing said sleeve relative to said casing.

11. An actuator as defined in claim 9, further including a pair of conical pulley flanges, said input shaft defines an outer portion projecting outwardly of said casing, said sleeve includes an outer portion projecting outwardly of said casing coaxially around and short of said outer input shaft portion, one of said conical pulley flanges is rotatably and axially restrained onto said outer input shaft portion for rotation with the latter and the other of said conical pulley flanges is rotatably and axially restrained onto said outer sleeve portion for axial displacement therewith toward and away from said one conical pulley flange.

12. An actuator as defined in claim 1, wherein said casing has a flow return passage extending therethrough and having opposite ends communicating with said chamber on said axially opposite sides respectively of said piston, a valve is inserted into said return passage and a control member is connected to said valve and arranged for selective setting of the latter.

13. An actuator as defined in claim 1, further including said casing forming a flow return passage extending therethrough and having opposite ends communicating with said chamber on said axially opposite sides respectively of said piston, said casing forming an exteriorly opening conduit peripherally communicating with said flow return passage, a removable cover tightly closing said conduit, a baffle plate inwardly positioned relative to said removable cover and in closing engagement in said conduit outwardly confining said return passage, and spring means biasing said baffle plate into said closing engagement.

14. A rotation responsive fluid pressure actuator as defined in claim 11, said piston includes a pair of axially spaced-apart walls forming a fluid inlet and a fluid outlet respectively, said fluid inlet is spaced radially inwardly of said fluid outlet relative to the axis of said piston, said passage extends between said axially spaced-apart walls and communicates said fluid inlet with said fluid outlet, said impeller includes impeller blades secured between said walls and arranged for rotation therewith and centrifugal impelling of fluid between said walls from said fluid inlet to said fluid outlet, said wall forming said fluid outlet is formed with screw threads extending axially and coaxially relative to said axis, a control ring threadably engages said screw thread and axially projects into said passage of said piston toward said wall forming said fluid inlet and forms an adjustable constriction in said passage, said casing forms a flow return passage extending therethrough and having opposite ends communicating with said chamber on said axially opposite sides respectively of said pistion, said casing forms an exteriorly opening conduit peripherally communicating with said flow return passage, a removable cover tightly closes said conduit, a baffle plate is inwardly positioned relative to said removable cover in closing engagement in said conduit outwardly confining said return passage, a spring engages between said cover and said baffle plate and biases the latter into said closing engagement, a valve is inserted in said return passage and has a stem portion projecting outwardly from said casing, and a lever is connected to said stem portion to actuate said valve.

* * * * *